(12) United States Patent
Ogren et al.

(10) Patent No.: US 7,182,458 B2
(45) Date of Patent: Feb. 27, 2007

(54) EYEGLASS CONNECTION SYSTEM

(76) Inventors: Steve Ogren, 6015 Kingsbriar Dr., Yorba Linda, CA (US) 92886; Carlos Reyes, 7 Villa Silla, Rancho Santa Margarita, CA (US) 92688

(\*) Notice: Subject to any disclaimer, the term of this patent is extended or adjusted under 35 U.S.C. 154(b) by 0 days.

(21) Appl. No.: 11/144,382

(22) Filed: Jun. 3, 2005

(65) Prior Publication Data

US 2005/0286012 A1 Dec. 29, 2005

Related U.S. Application Data

(60) Provisional application No. 60/577,090, filed on Jun. 4, 2004.

(30) Foreign Application Priority Data

Jun. 3, 2005 (WO) .................... PCT/US05/19710

(51) Int. Cl.
*G02C 1/02* (2006.01)
(52) U.S. Cl. ................ 351/110; 351/145; 351/146
(58) Field of Classification Search ................ 351/41, 351/110, 140, 141, 145, 146
See application file for complete search history.

(56) References Cited

U.S. PATENT DOCUMENTS 2,332,160 A  10/1943  McDonnell
6,170,950 B1 *  1/2001  Yoshida ...................... 351/110

FOREIGN PATENT DOCUMENTS

| EP | 0 666 490 A1 | 8/1995 |
| EP | 0 953 862 A2 | 11/1999 |
| FR | 2 705 467 | 5/1993 |
| WO | WO 00/26716 | 5/2000 |
| WO | WO 03/050595 A1 | 6/2003 |

\* cited by examiner

*Primary Examiner*—Huy Mai
(74) *Attorney, Agent, or Firm*—Knobbe, Martens, Olson & Bear

(57) ABSTRACT

Systems and methods of connecting components of eyeglasses or other brittle structures are disclosed. Fasteners such as screws can have compressible elements between them and a glass structure, for example, to disperse force and deter fracturing of the glass. Compressible elements can also conform to irregular cavities and surfaces to improve connections between components.

11 Claims, 4 Drawing Sheets

EYEGLASS CONNECTION SYSTEM

REFERENCE TO RELATED APPLICATION

This application claims priority to U.S. Provisional Patent Application No. 60/577,090, filed Jun. 4, 2004, the entire disclosure of which is hereby incorporated by reference.

BACKGROUND OF THE INVENTIONS

Field of the Inventions

The present inventions relate to eyeglass connection systems, and, in particular, systems for connecting lenses to adjacent eyeglass components, particularly in rimless eyeglass systems, which reduce stress and fractures in the lenses.

SUMMARY OF THE INVENTIONS

In some embodiments, an eyeglass connection system comprises a lens with a first surface, a second surface, and a lens aperture extending from the first surface to the second surface. The lens aperture can have a first region adjacent to the first surface of the lens with a first cross-sectional area. Additionally, the lens aperture can have a second region adjacent to the second surface of the lens with a second cross-sectional area. The second cross-sectional area of the lens aperture can be larger than the first cross-sectional area of the lens aperture. The eyeglass connection system can further comprise a compressible element with a first side and a second side, the compressible element positioned at least partially within the posterior region of the lens aperture. Additionally, the eyeglass system can comprise a lens support with a lens support aperture and a washer positioned between the lens and the lens support. The washer can have a higher durometer than the compressible element. Moreover, the system can comprise a fastener with a head and a shaft, the head positioned near the second side of the compressible element and the shaft extending from the head, through the compressible element, lens aperture, and washer, and into the lens support aperture.

DETAILED DESCRIPTION OF THE PREFERRED EMBODIMENT

Figure 1:
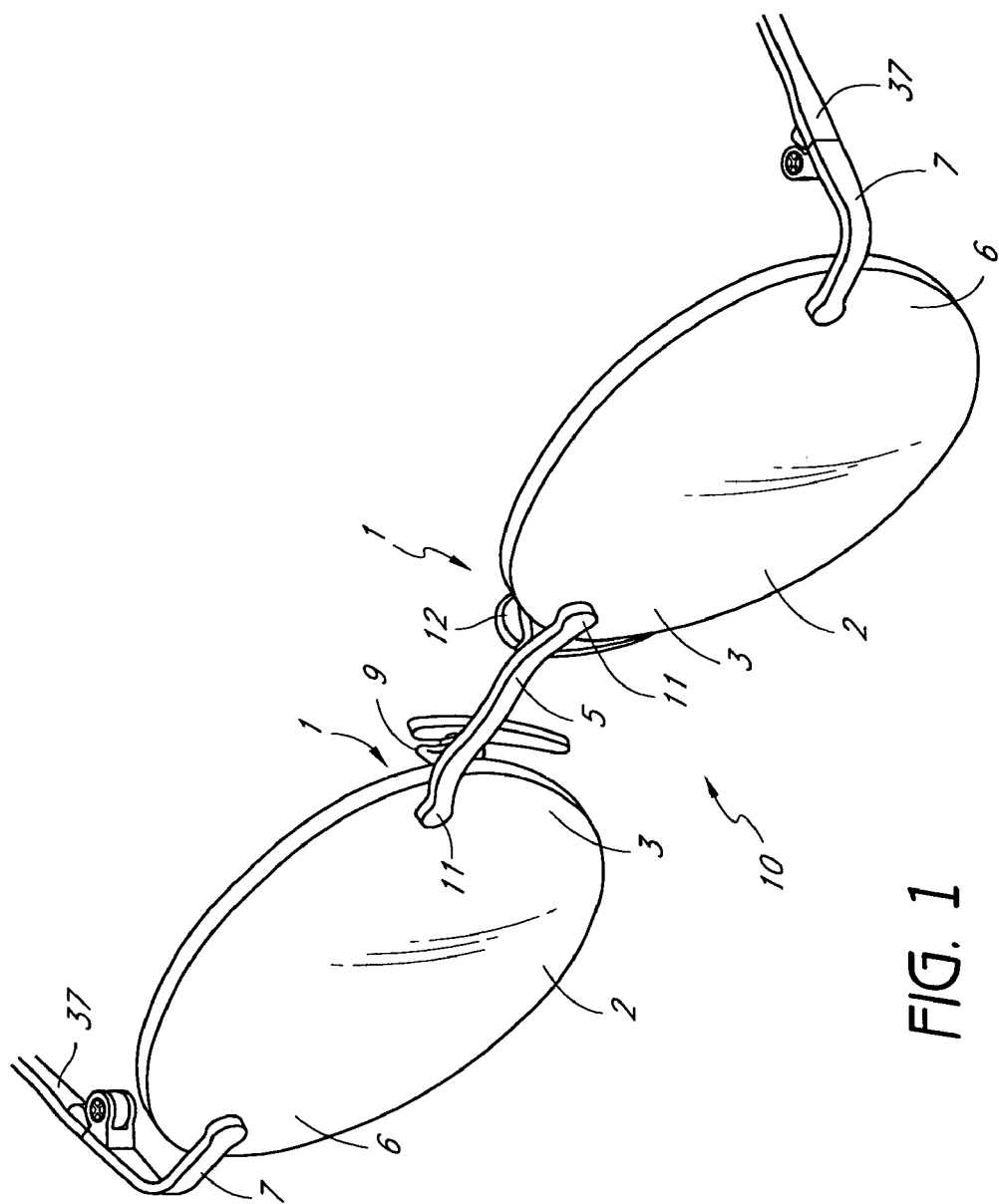
FIG. 1 is a schematic, front elevational perspective view of a rimless eyeglass system.

Referring to FIG. 1, there is illustrated a front elevational perspective view of an eyeglass system which incorporates an eyeglass connector. An eyeglass 10 comprises a first lens 2 and second lens 2 connected by a bridge 5. Each lens 2 includes a medial portion 3 and a lateral portion 6. In the vicinity of the medial portion 3, a lens support 11 attached to the bridge 5 overlaps either a first surface (such as an anterior surface) or a second surface (such as a posterior surface) of the lens 2. In the illustrated embodiment, the lens support 11 overlaps the anterior surface of the lens 2, but the lens support 11 could also overlap the posterior surface of the lens 2. Connected to either the bridge 5 or the lens 2 is a nose pad support 9 and a nose pad 12.

In the vicinity of the lateral portion 6 of the lens 2, an ear stem connector 7 is provided, which is normally hingedly connected to an ear stem 37. The ear step connector 7 can also have an ear stem support 13 that overlaps either the anterior surface or the posterior surface of the lens 2. In the illustrated embodiment, the ear stem support 13 overlaps the anterior surface of the lens 2.

In the foregoing type of eyeglass system, each lens is connected at two points to adjacent structure. Although the eyeglass connection system will be described primarily in the context of the connections between the bridge 5 and the right and left lens, the eyeglass connection system may also be utilized at another portion of the lenses 2 (such as the lateral portions 6 of the lenses 2) to connect the ear stem connectors 7.

In addition, although the eyeglass connection system will be described primarily in the context of an eyeglass design in which the lens support 11 extends across a portion of the anterior surface of the lens 2, the connection system may be reversed so that the lens support 11 (or the ear stem support 13) extends across a portion of the posterior surface of the lens 2.

Figure 2:
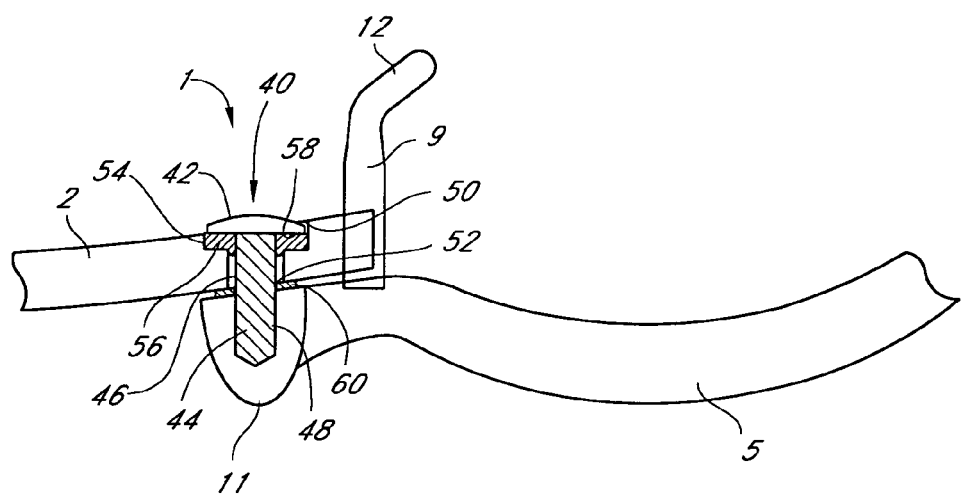
FIG. 2 is a cross-sectional view of a portion of one embodiment of an eyeglass system having a connector in accordance with the present inventions.

FIG. 2 shows a horizontal cross-sectional view through a portion of the eyeglass 10, across an eyeglass connector 1. The eyeglass connector 1 connects a lens 2 to a lens support 11 on a bridge 5. As is illustrated in FIG. 1, the lens support 11 extends across a portion of the anterior surface of the lens 2.

The lens connector 1 comprises a fastener 40 such as a screw, having a radially enlarged head 42 connected to a threaded shaft 44. The threaded shaft 44 extends through a lens aperture 46, and into a lens support aperture 48. The threaded shaft 44 and lens support aperture 48 have complimentary threads, to enable engagement of the fastener 40 with the lens support 11. In some embodiments, the fastener 40 can comprise an industry standard, 1.4 mm, stainless steel screw.

The lens aperture 46 has a first, larger diameter 50 at the posterior side of the lens, and a second, smaller diameter 52 at the anterior side of the lens. This configuration, in cooperation with the configuration of the threaded shaft 44 creates a cavity, such as an annular cavity 54. The shape of the annular cavity 54 is generally determined by the configuration of the threaded shaft 44, a compression surface 58 on the anterior surface of the head 42, and the wall of the cavity 54.

A compressible element 56 is positioned within the cavity 54. The compressible element 56 can comprise any of a variety of compressible media, such as rubber, silicone, neoprene, and others which will be apparent to those of skill in the art in view of the disclosure herein. In general, the compressible element 56 is sufficiently compressible that, as the fastener is advanced into the lens support aperture 48, the compression surface 58 will force the compressible element 56 to compress along the axis of the advancing fastener and expand in a direction perpendicular to such axis, preferably causing the compressible element 56 to substantially conform to the shape of the cavity 54. In some embodiments, the compressible element 56 can expand or compress in a variety of directions, according to the shapes of the cavity and the fastener employed. In some embodiments, the compressible element 56 is an o-ring formed from a nitrile material. Nitrile generally has good memory characteristics (e.g., a high compression set) and has the advantage of meeting certain environmental requirements. In another embodiment, the o-ring comprises another known material having a high compression set, so that the frame maintains a tightly assembled feel. In some embodiments, the o-ring is a standard, off-the-shelf o-ring or compressible element (e.g., not necessarily custom sized or made of a custom material). In some embodiments, the o-ring comprises Nitrile material having a Shore: A durometer of 85+/−10.

In the illustrated embodiment, the lens aperture 46 has a slightly larger inside diameter along at least a portion of its length, than the outside diameter of the threaded shaft 44. This creates an annular space surrounding the threaded shaft 44, into which the compressible element 56 can at least partially extrude, under compression from the head 42. In this configuration, the lens aperture may be considered to have a stepped inside diameter, in which a greater inside diameter exists adjacent the posterior surface of the lens 2 and a smaller inside diameter exists adjacent an anterior surface of the lens 2. However, the precise configuration of the lens aperture 46 may be varied considerably, while remaining within the scope of the present inventions.

Figure 3:
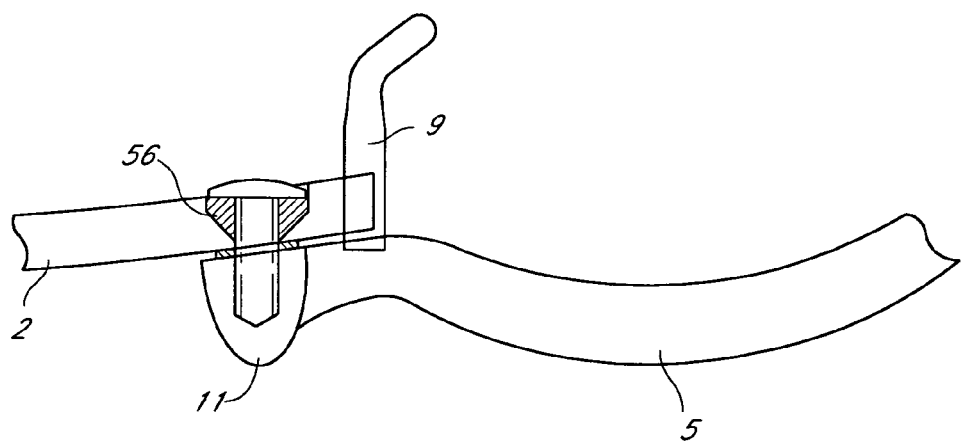
FIG. 3 is a partial cross-sectional view of a portion of another embodiment of an eyeglass system having a connector in accordance with the present inventions.

For example, FIG. 3 illustrates an alternative configuration for the lens aperture 46. In the illustration, the lens aperture 46 includes a first, generally cylindrical portion adjacent the posterior surface of the lens. The generally cylindrical portion adjoins a frustoconical portion which tapers from a larger diameter to a smaller diameter in the direction of the anterior surface of the lens. As a further alternative, the entire lens aperture 46 may comprise a frustoconical, or tapered configuration.

Figure 4:
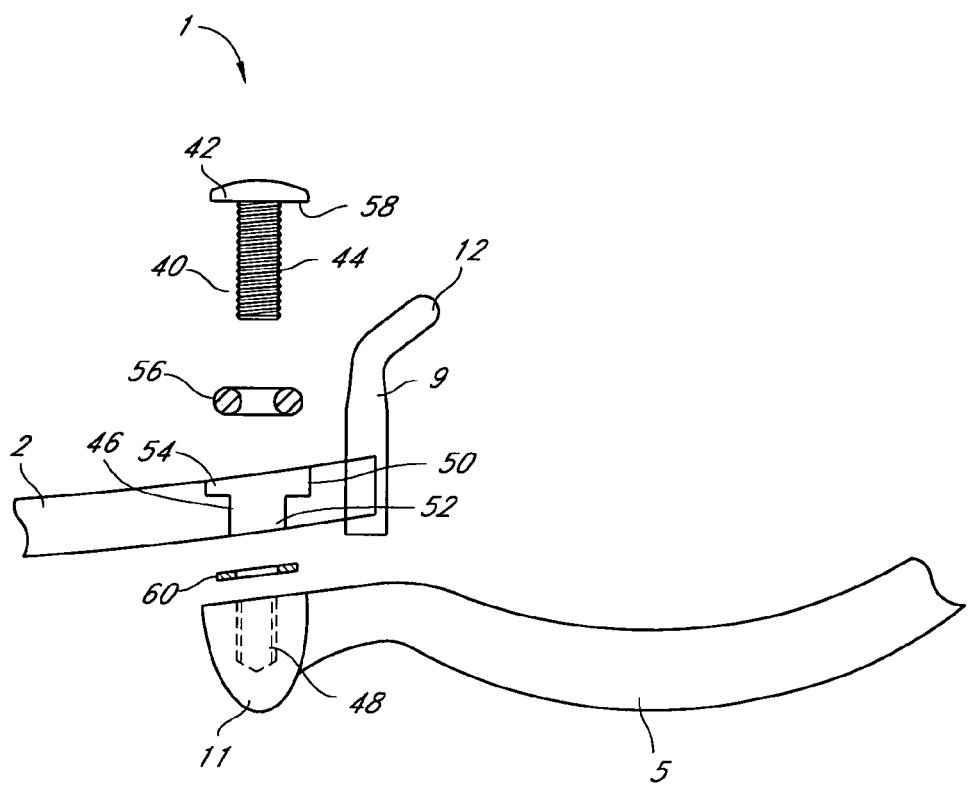
FIG. 4 is an exploded view of the eyeglass connector of FIG. 2.
Figure 5:
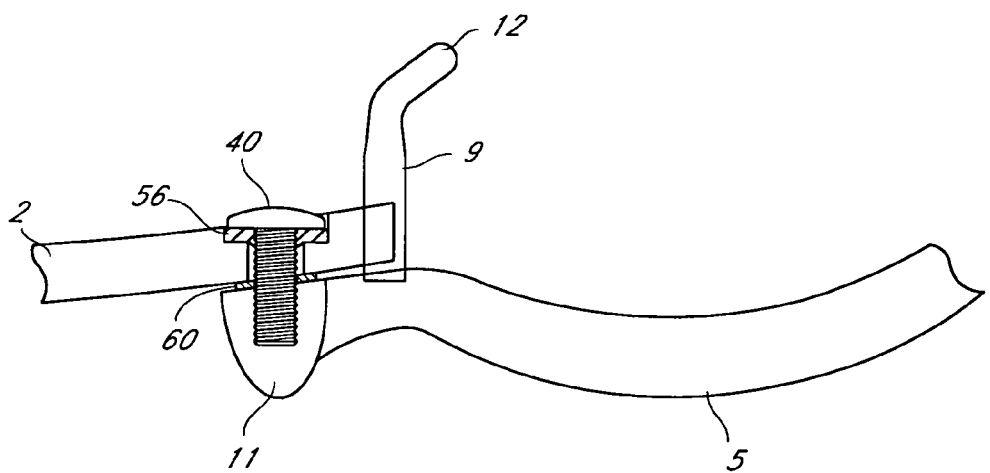
FIG. 5 is an assembled view of the eyeglass connector illustrated in FIG. 4.
Figure 6:
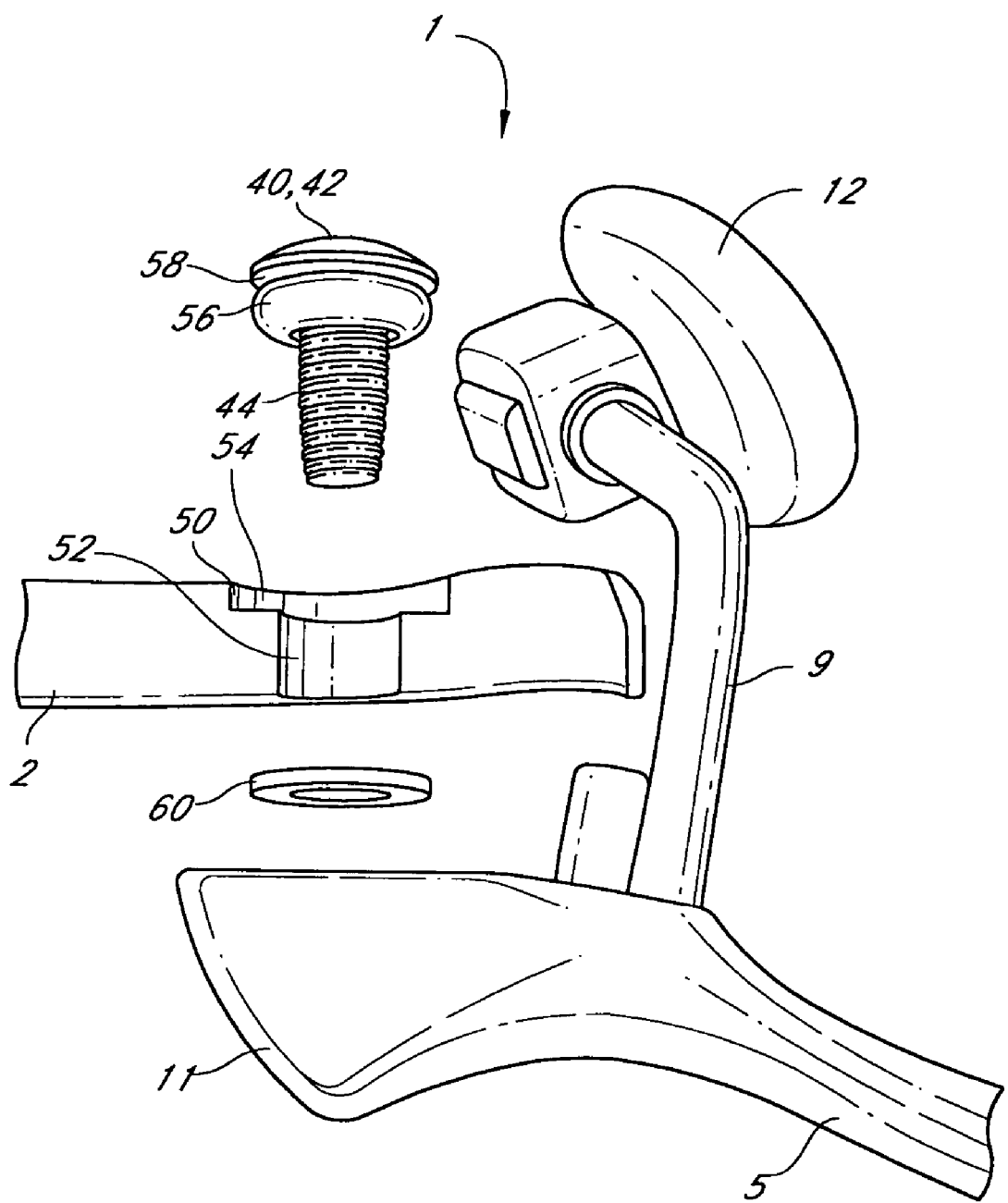
FIG. 6 is a partial perspective exploded view of an eyeglass connector in accordance with the present inventions.

Prior to compression, the compressible element 56 may take any of a variety of configurations. In some embodiments, the compressible element 56 is a torus, having a body with a generally circular cross-section, rotated about a central aperture and joined to itself. See, for example, FIG. 4. Alternatively, the compressible element 56 can have a substantially torroidal shape. In some embodiments the compressible element 56 can extend substantially completely around the fastener 40, but without joining to itself. In some embodiments, the compressible element 56 is C-shaped. In some embodiments, the compressible element is U-shaped. Furthermore, the cross-section may be any of a variety of non-round configurations, such as square, rectangular, triangular, or others, depending upon the desired performance. The uncompressed shape of the compressible element 56 can also be determined by economic factors. For example, shapes that are more readily available or cheaper to obtain or manufacture may be preferred.

The total volume of the compressible element 56 is preferably calibrated with respect to the volume of the cavity 54 so that the compressible element 56 substantially fills the cavity 54 when the fastener 40 is fully installed. Alternatively, depending upon the durometer of the compressible element 56, a larger or smaller portion of the cavity 54 may remain unfilled by the compressible element 56 upon complete assembly of the connector 1. The cavity 54 can act as a counterbore for the o-ring. In some embodiments, the counterbore constrains the o-ring from squeezing outward too far. In some embodiments, the counterbore diameter is slightly larger than the o-ring diameter. When compressed, the o-ring is forced outward (into the counterbore walls), thereby forcing the o-ring downward (which creates a tight feeling frame).

A washer 60 may additionally be provided in-between the lens support 11 and the lens 2. In some embodiments, the washer comprises a poly washer. In one embodiment, for example, the poly washer comprises an industry-standard polyethelyne washer. The washer can form a complete ring, having an O-shape. In some embodiments, the washer can have a C-shape or a U-shape, for example.

In some embodiments, the washer 60 can have a harder durometer than the compressible element 56. This can be especially desirable if the washer 60 is not intended to conform to fill a cavity with complex contours or structure. Thus, the washer 60 can be configured to distribute force into a greater surface area of a contacted surface. However, a harder material that does not conform can be better adapted to distributing force in a particular direction, as opposed to distributing force in various diffuse directions that may change depending on the shape and structure of the hole.

If the washer 60 and the compressible element 56 are both considered to be part of a general set of force-distributing structures having different durometers, conformability can be inversely related to durometer. Thus, a compressible element 56 can be both more conforming and less hard than a washer 60. Accordingly, if the shape of a particular orifice to be filled by a force-distributing structure is more complex, it may be advantageous to choose a lower durometer, more highly conforming material. On the other hand, a higher durometer (and potentially higher strength) material can be chosen if the orifice or complementary structure is less complex and less likely to require drastic conformation.

In accordance with another aspect of the embodiments described herein, the material from which the compressible element or o-ring is made preferably has a high compression set. The material of the o-ring preferably does not permanently conform to the shape into which it is exerted, but can resiliently return to an original shape or volume. In one embodiment, the o-ring material or compressible element material comprises Shore A: 85+/−5. In another embodiment, the o-ring material comprises Shore A: 70 through 90. The material is preferably not so soft that it becomes permanently deformed under stress, resulting in a frame that feels loose. In one exemplary embodiment, the upper limit is about Shore A: 95 through 100.

One aspect of the described system allows for less stringent machining tolerances. Imperfections in lens drilling or manufacturing tolerances can be effectively eliminated because the relatively soft material molds itself into the adjacent surfaces. For example, if a compressible element 56 is provided within a cavity 54, the cavity 54 need not be machined to match the size or configuration of the fastener 40 as precisely as may otherwise be desirable. Similarly, because the compressible element 56 can fill irregularly-formed cavities or voids, machining tolerances of various portions of the system can be relaxed while at the same time minimizing adverse affects. Such portions include, without limitation, the lens aperture 46, the larger diameter 50, the smaller diameter 52, the annular cavity 54, etc. Indeed, in some circumstances, it can be preferable to have lower machining tolerances because the manufacturing process can be faster. Inclusion of a compressible element 56 also allows for a wider variety of fasteners 40 to be used without a need for adapting the size of the annular cavity 54 to match the particular fastener 40.

Another advantage of the described system allows an increased contact area between the fastener 40 and the lens 2. If no compressible element 56 is used, the fastener 40 can contact the lens 2 directly at a few specific points. Because it is difficult to machine an annular cavity 54, for example, to exactly fit the contours of a fastener 40, slight differences in the two cooperative surfaces will concentrate the fastening force on a few corners or protrusions rather than distributing that force evenly over the annular cavity 54. In the absence of a compressible element 56, such uneven force distribution can lead to cracked lenses or to the creation of weak areas in brittle materials (such as a glass or polymer lens 2). However, the compressible element 56 can accommodate various irregularities in the two cooperative surfaces (e.g., one on the lens 2 and one on the fastener 40). In fact, while the irregularities may not be desirable where no compressible element 56 is present, such surface irregularities can in fact be helpful to provide the compressible element 56 slight depressions into which it can protrude, thus increasing the compressible element's ability to randomly and/or diffusefly distribute the force.

Not only can the described system alleviate requirements for machining tolerances, the compressible elements or o-rings (or similar types of compressible washers or the like) can act as suspension buffers to absorb screw (or other mounting hardware) stress. In particular, the compressible element 56, when placed into contact with both the fastener 40 and the lens 2, can help spread force, which in turn can increase the useful lifetime of the lens. This effect can improve the efficiency of the contact between a rigid connection device (such as the fastener 40) and the complementary surface of a bore in a brittle material (such as a lens 2). In particular, the compressible element 56 can conform to adjacent surfaces. In one embodiment, the o-rings are soft enough that when compressed, for example, with a screw, the o-rings disperse stress evenly downward into the lens as well as outward from the o-ring. The dispersed load (downward and outward) substantially increases the surface area at which the stress is applied, thus dispersing the overall load. In contrast, a hard washer (e.g., an industry standard poly washer) may not have the capability to conform and thereby exerts stress at contact points. Such stress can result in cracks or chipping in those areas.

The compressible element 56 can also provide a fastener locking function by resisting twisting by the fastener 40. For example, if the fastener is tightened down, compressing the compressible element 56 and deforming that element, the fastener 40 can have great frictional resistance against the compressible element 56. The compressible element 56 can function as a resilient and/or rubber grip, for example, that resists loosening of a screw or other fastener 40.

The principles and inventions described herein can also have useful application in attaching brittle and/or rigid materials using hard components such as screws. For example, similar structures can be used in attaching panel or plate glass to vehicles or to buildings. For example, compressible o-rings can be used to distribute the force of a connecting screw, to prevent localized stress in brittle materials such as glass, and to allow for relaxed machining tolerances and more efficient manufacture. Another application is in goggles for swimming or skiing. Prescription inserts can be inserted into swimming or skiing goggles, requiring a connection between brittle or glass-like materials and involving metal screws, for example. Indeed, the described inventions have broad applicability to reducing the risk of material failure due to fracture or other compromise of the integrity of two juxtaposed materials.

While the inventions have been illustrated and described with particularity in terms of preferred embodiments, it should be understood that no limitation of the scope of the inventions is intended thereby. Features of any of the foregoing methods and devices may be substituted or added into the others, as will be apparent to those of skill in the art. It should also be understood that variations of the particular embodiments described herein incorporating the principles of the present inventions will occur to those of ordinary skill in the art and yet be within the scope of the inventions.

We claim:

1. An eyeglass connection system comprising:
    a lens with a first surface, a second surface, and a lens aperture extending from the first surface to the second surface, the lens aperture having a first region adjacent to the first surface of the lens with a first cross-sectional area and a second region adjacent to the second surface of the lens with a second cross-sectional area, the second cross-sectional area of the lens aperture being larger than the first cross-sectional area of the lens aperture;
    a compressible element with a first side and a second side, the compressible element positioned at least partially within the second region of the lens aperture;
    a lens support with a lens support aperture;
    a washer positioned between the lens and the lens support, the washer having a higher durometer than the compressible element; and
    a fastener with a head and a shaft, the head positioned near the second side of the compressible element and the shaft extending from the head, through the compressible element, lens aperture, and washer, and into the lens support aperture.

2. The system of claim 1, wherein the lens aperture comprises a frustoconical portion.

3. The system of claim 1, wherein the compressible element comprises an o-ring.

4. The system of claim 1, wherein the compressible element substantially surrounds the shaft of the fastener.

5. The system of claim 1, wherein the total volume of the compressible element substantially fills a cross-sectional area of the second region.

6. The system of claim 1, wherein the compressible element comprises a material having a durometer in the range of approximately Shore A: 70 through approximately shore A: 90.

7. The system of claim 1, wherein the compressible element comprises a material having a durometer less than approximately Shore A: 100.

8. The system of claim 1, wherein the compressible element comprises nitrile material having a Shore A durometer of approximately 85.

9. The system of claim 1, wherein the washer is a round, continuous annulus.

10. The system of claim 1, wherein the washer has a harder durometer than the compressible element.

11. The system of claim 1, wherein the washer is formed from polyethelyne.

* * * * *